US010448222B2

(12) United States Patent
Shaheen

(10) Patent No.: US 10,448,222 B2
(45) Date of Patent: *Oct. 15, 2019

(54) REPORTING TERMINAL CAPABILITIES FOR SUPPORTING SHORT MESSAGE SERVICE

(71) Applicant: InterDigital Technology Corporation, Wilmington, DE (US)

(72) Inventor: Kamel M. Shaheen, Camas, WA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,072

(22) Filed: Nov. 13, 2018

(65) Prior Publication Data

US 2019/0082309 A1    Mar. 14, 2019

Related U.S. Application Data

(63) Continuation of application No. 15/270,760, filed on Sep. 20, 2016, now Pat. No. 10,129,715, which is a
(Continued)

(51) Int. Cl.
*H04W 4/14* (2009.01)
*H04L 12/58* (2006.01)
(Continued)

(52) U.S. Cl.
CPC .............. *H04W 4/14* (2013.01); *H04L 51/38* (2013.01); *H04L 61/2007* (2013.01);
(Continued)

(58) Field of Classification Search
CPC ....... H04L 12/5895; H04L 51/38; H04W 4/14
(Continued)

(56) References Cited

U.S. PATENT DOCUMENTS 5,519,834 A    5/1996  Kamerman et al.
6,301,242 B1  10/2001  Lindsay et al.
(Continued)

FOREIGN PATENT DOCUMENTS

CN         1585372      2/2005
EP       1 056 269    11/2000
(Continued)

OTHER PUBLICATIONS

3rd Generation Partnership Project; Technical Specification Group Services and System Aspects; IP Multimedia System (IMS) messaging; Stage 1 (Release 6) 3GPP TS 22.340 V6.2.0 (Mar. 2005).
(Continued)

*Primary Examiner* — Sam Bhattacharya
(74) *Attorney, Agent, or Firm* — Volpe and Koenig, P.C.

(57) ABSTRACT

A method and apparatus for receiving an IP-based message, by a first UE over a WLAN, is provided. The method may comprise transmitting at least one IP-based registration message and transmitting capability information including at least a terminal type of the first UE. The first UE may receive from a second UE, the IP-based message formatted according to the capability information. The first UE may be addressed using a first MSISDN. In one embodiment, the capability information indicates a memory size of the first UE. In one embodiment, the capability information indicates support for the first UE to receive an animation.

20 Claims, 5 Drawing Sheets

Related U.S. Application Data continuation of application No. 14/015,552, filed on Aug. 30, 2013, now Pat. No. 9,578,475, which is a continuation of application No. 13/463,293, filed on May 3, 2012, now Pat. No. 8,526,981, which is a continuation of application No. 12/973,570, filed on Dec. 20, 2010, now Pat. No. 8,175,626, which is a continuation of application No. 12/777,927, filed on May 11, 2010, now Pat. No. 7,899,477, which is a continuation of application No. 11/112,503, filed on Apr. 22, 2005, now Pat. No. 7,715,856.

(60) Provisional application No. 60/576,700, filed on Jun. 2, 2004.

(51) Int. Cl.
*H04L 29/12* (2006.01)
*H04W 60/00* (2009.01)
*H04W 84/02* (2009.01)
*H04W 84/12* (2009.01)

(52) U.S. Cl.
CPC ......... *H04L 61/2592* (2013.01); *H04W 60/00* (2013.01); *H04W 84/02* (2013.01); *H04W 84/12* (2013.01)

(58) Field of Classification Search
USPC ......... 455/414.1, 424, 425, 453, 466, 552.1, 455/554.2; 370/338
See application file for complete search history.

(56) References Cited

U.S. PATENT DOCUMENTS

| | | |
|---|---|---|
| 6,658,011 B1 | 12/2003 | Sevanto et al. |
| 6,678,361 B2 | 1/2004 | Rooke et al. |
| 6,725,031 B2 | 4/2004 | Watler et al. |
| 6,871,070 B2 | 3/2005 | Ejzak |
| 6,885,871 B2 | 4/2005 | Caloud |
| 6,940,844 B2 | 9/2005 | Purkayastha et al. |
| 6,977,921 B1 | 12/2005 | Dolan |
| 7,079,524 B2 | 7/2006 | Bantuki et al. |
| 7,181,231 B2 | 2/2007 | Le Bodic et al. |
| 7,310,514 B2 | 12/2007 | Shinohara |
| 7,502,339 B1 | 3/2009 | Pirkola et al. |
| 7,715,856 B2 | 5/2010 | Shaheen |
| 8,023,941 B2 | 9/2011 | Shaheen et al. |
| 8,090,392 B2 | 1/2012 | Shaheen |
| 8,175,626 B2 | 5/2012 | Shaheen |
| 8,731,097 B2 | 5/2014 | Laumen et al. |
| 8,923,901 B2 | 12/2014 | Shaheen |
| 2002/0077132 A1 | 6/2002 | Mizell et al. |
| 2002/0085516 A1 | 7/2002 | Bridgelall |
| 2002/0136173 A1 | 9/2002 | Monroe et al. |
| 2002/0191575 A1 | 12/2002 | Kalavade et al. |
| 2003/0016639 A1 | 1/2003 | Kransmo et al. |
| 2003/0026245 A1 | 2/2003 | Ejzak |
| 2003/0172121 A1 | 9/2003 | Evans et al. |
| 2003/0233457 A1 | 12/2003 | Basilier et al. |
| 2004/0006641 A1 | 1/2004 | Abrol et al. |
| 2004/0066756 A1 | 4/2004 | Ahmavaara et al. |
| 2004/0067761 A1 | 4/2004 | Pyhalammi et al. |
| 2004/0071127 A1 | 4/2004 | Hurtta |
| 2004/0106430 A1 | 6/2004 | Schwarz et al. |
| 2004/0151192 A1 | 8/2004 | Trossen |
| 2004/0185837 A1 | 9/2004 | Kim et al. |
| 2004/0199649 A1 | 10/2004 | Tarnanen et al. |
| 2004/0203737 A1 | 10/2004 | Myhre et al. |
| 2004/0203763 A1 | 10/2004 | Tammi |
| 2004/0224666 A1 | 11/2004 | Jain et al. |
| 2004/0249891 A1 | 12/2004 | Khartabil et al. |
| 2004/0259531 A1 | 12/2004 | Wood et al. |
| 2005/0002407 A1 | 1/2005 | Shaheen |
| 2005/0007984 A1 | 1/2005 | Shaheen et al. |
| 2005/0020286 A1 | 1/2005 | Lazaridis et al. |
| 2005/0117602 A1 | 6/2005 | Carrigan et al. |
| 2005/0198304 A1 | 9/2005 | Oliver et al. |
| 2005/0203698 A1 | 9/2005 | Lee |
| 2005/0233758 A1 | 10/2005 | Salmi |
| 2005/0282567 A1 | 12/2005 | Ala-Luukko |
| 2006/0046721 A1* | 3/2006 | Sernan-Dez Arppe ............ H04M 3/10 455/435.2 |
| 2006/0135182 A1 | 6/2006 | Unmehopa |
| 2006/0136554 A1 | 6/2006 | Rajaniemi et al. |

FOREIGN PATENT DOCUMENTS

| | | |
|---|---|---|
| EP | 1 257 141 | 11/2002 |
| EP | 1 357 764 | 10/2003 |
| EP | 1 515 514 | 3/2005 |
| JP | 2003-263392 | 9/2003 |
| JP | 2004-153383 | 5/2004 |
| RU | 2000-113222 | 4/2002 |
| RU | 2004-138808 | 8/2005 |
| WO | 00/33498 | 6/2000 |
| WO | 00/079813 | 12/2000 |
| WO | 02/093957 | 3/2002 |
| WO | 03/003653 | 1/2003 |
| WO | 03/079637 | 9/2003 |
| WO | 03/085911 | 10/2003 |
| WO | 03/096603 | 11/2003 |
| WO | 03/103198 | 12/2003 |
| WO | 03/107621 | 12/2003 |
| WO | 04/004407 | 1/2004 |
| WO | 04/006594 | 1/2004 |
| WO | 04/008178 | 1/2004 |
| WO | 04/012471 | 2/2004 |
| WO | 04/034718 | 4/2004 |
| WO | 06/001683 | 1/2006 |

OTHER PUBLICATIONS

3$^{rd}$ Generation Partnership Project; Technical Specification Group Services and System Aspects; IP Multimedia System (IMS) messaging; Stage 1 (Release 7) 3GPP TS 22.340 V7.0.0 (Dec. 2005).

3rd Generation Partnership Project; Technical Specification Group Services and System Aspects; Support of SMS and MMS over generic 3GPP IP access; Stage 2 (Release 7), 3GPP TS 23.204 V1.1.0 (Feb. 2006).

3$^{rd}$ Generation Partnership Project; Technical Specification Group Core Network and Terminals; Voice Call Continuity between the Cireuit-Switched (CS) domain and the IP Multimedia (IP) Core Network (CN) subsystem; Stage 3 (Release 7) 3GPP TS 24.206 V0.4.0 (Feb. 2006).

3$^{rd}$ Generation Partnership Project; Technical Specification Group Core Network and Terminals; Voice Call Continuity between the Cireuit-Switched (CS) domain and the IP Multimedia (IP) Core Network (CN) subsystem; Stage 3 (Release 7) 3GPP TS 24.206 V0.6.0 (Jul. 2006).

3rd Generation Partnership Project; Technical Specification Group Core Network and Terminals; Support of SMS and MMS over IP networks; Stage 3 (Release 7), 3GPP TS 24.341 V0.1.0 (May 2006).

3rd Generation Partnership Project; Technical Specification Group GSM/EDGE Radio Access Network; Mobile radio interface layer 3 specification; Radio Resource Control Protocol (Release 1999), 3GPP TS 04.18 V8.27.0 (May 2006).

3rd Generation Partnership Project; Technical Specification Group GSM EDGE Radio Access Network; Mobile-services Switching Centre—Base Statioh System (MSC—BSS) interface; Layer 3 specification (Release 1998), 3GPP TS 08.08 V7.7.0 (Oct. 2000).

3rd Generation Partnership Project; Technical Specification Group Terminals; Technical realization of the Short Message Service (SMS) (Release 1999) 3GPP TS 23.040 V3.10.0 (Jun. 2003).

3rd Generation Partnership Project; Technical Specification Group Core Network and Terminals; Technical realization of the Shem Message Service (SMS) (Release 6), 3GPP TS 23.040 V6.7.0 (Mar. 2006).

(56) References Cited

OTHER PUBLICATIONS

3rd Generation Partnership Project; Technical Specification Group Services and System Aspects; IP Multimedia Subsystem (IMS); Stage 2 (Release 5), 3GPP TS 23.228 V5.14.0 (Sep. 2005).
3rd Generation Partnership Project; Technical Specification Group Services and System Aspects; IP Multimedia Subsystem (WIS); Stage 2 (Release 6), 3GPP TS 23.228 V6.10.0 (Jun. 2005).
3rd Generation Partnership Project; Technical Specification Group Services and System Aspects; IP Multimedia Subsystem (WIS); Stage 2 (Release 6), 3GPP TS 23.228 V6.13.0 (Mar. 2006).
3rd Generation Partnership Project; Technical Specification Group Services and System Aspects; 3GPP system to Wireless Local Area Network (WLAN) interworking; System description (Release 6), 3GPP TS 23.234 V6.5.0 (Jun. 2005).
3rd Generation Partnership Project; Technical Specification Group Services and System Aspects; 3GPP system to Wireless Local Area Network (WLAN) interworking; System description (Release 6), 3GPP TS 23.234 V6.8.0 (Mar. 2006).
3rd Generation Partnership Project; Technical Specification Group Services and System Aspects; 3GPP system to Wireless Local Area Network (WLAN) interworking; System description (Release 7), 3GPP TS 23.234 V7.0.0 (Dec. 2005).
3rd Generation Partnership Project; Technical Specification Group Services and System Aspects; 3GPP system to Wireless Local Area Network (WLAN) interworking; System description (Release 7), 3GPP TS 23.234 V7.1.0 (Mar. 2006).
3rd Generation Partnership Project; Technical Specification Group Services and System Aspects; Support of SMS and MMS over generic 3GPP IP access (Release 7), 3GPP TR 23.804 V7.0.0 (Jun. 2005).
3rd Generation Partnership Project; Technical Specification Group Core Network and Terminals; Point-to-Point (PP) Short Message Service (SMS) support on mobile radio interface (Release 6), 3GPP TS 24.011 V6.1.0 (Jun. 2005).
3rd Generation Partnership Project; Technical Specification Group Radio Access Network; Radio Resource Control (RRC) protocol specification (Release 1999), 3GPP TS 25.331 V3.21.0 (Dec. 2004).
3rd Generation Partnership Project; Technical Specification Group Radio Access Network; Radio Resource Control (RRC); Protocol Specification (Release 4), 3GPP TS 25.331 V4.17.0 (Mar. 2005).
3rd Generation Partnership Project; Technical Specification Group Radio Access Network; Radio Resource Control (RRC); Protocol Specification (Release 5), 3GPP TS 25.331 V5.13.0 (Jun. 2005).
3rd Generation Partnership Project; Technical Specification Group Radio Access Network; Radio Resource Control (RRC); Protocol Specification (Release 5), 3GPP TS 25.331 V5.16.0 (Mar. 2006).
3rd Generation Partnership Project; Technical Specification Group Radio Access Network; Radio Resource Control (RRC); Protocol Specification (Release 6), 3GPP TS 25.331 V6.6.0 (Jun. 2005).
3rd Generation Partnership Project; Technical Specification Group Radio Access Network; Radio Resource Control (RRC); Protocol Specification (Release 6), 3GPP TS 25.331 V6.9.0 (Mar. 2006).
3rd Generation Partnership Project; Technical Specification Group Radio Access Network; Radio Resource Control (RRC); Protocol Specification (Release 7), 3GPP TS 25.331 V7.0.0 (Mar. 2006).
3rd Generation Partnership Project; Technical Specification Group Core Network; Mobile Application Part (MAP) specification (Release 1999), 3GPP TS 29.002 V3.20.0 (Jun. 2004).
3rd Generation Partnership Project; Technical Specification Group Core Network; Mobile Application Part (MAP) specification; (Release 4), 3GPP TS 29.002 V4.15.0 (Jun. 2004).
3rd Generation Partnership Project; Technical Specification Group Core Network; Mobile Application Part (MAP) sbecifi0ati0n; (Release 4), 3GPP TS 29.002 V4.16.0 (Sep. 2005).
3rd Generation Partnership Project; Technical Specification Group Core Network; Mobile Application Part (MAP) specification; (Release 5), 3GPP TS 29.002 V5.10.0 (Jun. 2004).
3rd Generation Partnership Project; Technical Specification Group Core Network; Mobile Application Part (MAP) specification; (Release 5), 3GPP TS 29.002 V5.11.0 (Sep. 2005).
3rd Generation Partnership Project; Technical Specification Group Core Network and Terminals; Mobile Application Part (MAP) specification; (Release 6), 3GPP TS 29.002 V6.10.0 (Jun. 2005).
3rd Generation Partnership Project; Technical Specification Group Core Network and Terminals; Mobile Application Part (MAP) specification; (Release 6), 3GPP TS 29.002 V6.13.0 (Mar. 2006).
3rd Generation Partnership Project; Technical Specification Group Core Network and Terminals; Mobile Application Part (MAP) specification; (Release 7), 3GPP TS 29.002 V7.0.0 (Jun. 2005).
3rd Generation Partnership Project; Technical Specification Group Core Network and Terminals; Mobile Application Part (MAP) specification; (Release 7), 3GPP TS 29.002 V7.3.0 (Mar. 2006).
3rd Generation Partnership Project; Technical Specification Group Terminals; 3GPP Generic User Profile Common Objects; Stage 3 (Release 6), 3GPP TS 24.241 V0.5.0 (Nov. 2003).
3rd Generation Partnership Project; Technical Specification Group Services and System Aspects; Support of SMS and MMS over generic 3GPP IP access (Release 7), 3GPP TR 23.804 V7.1.0 (Sep. 2005).
3rd Generation Partnership Project; Technical Specification Group Core Network; Point-to-Point (PP) Short Message Service (SMS) support on mobile radio interface (Release 5), 3GPP TS 24.011 V5.2.0 (Jun. 2003).
3rd Generation Partnership Project; Technical Specification Group Core Network; Point-to-Point (PP) Short Message Service (SMS) support on mobile radio interface (Release 4), 3GPP TS 24.011 V4.1.1 (Jun. 2002).
3rd Generation Partnership Project; Technical Specification Group Core Network; Point to Point (PP) Short Message Service (SMS) support on mobile radio interface (Release 1999), 3GPP TS 24.011 V3.6.0 (Mar. 2001).
De Vriendt et al., "Mobile Network Evolution: A Revolution on the Move," IEEE Communications Magazine, vol. 40, No. 4, pp. 104-111, (Apr. 2002).
Digital cellular telecommunications system (Phase 2); Mobile-services Switching Centre—Base Station System (MSC—BSS) interface; Layer 3 specification (GSM 08.08 version 4.12.1), ETS 300 590 (Oct. 1998).
Digital cellular telecommunications system (Phase 2+); Mobile radio interface layer 3 specification, Radio Resource Control Protocol (GSM 04.18 version 9.0.0 Release 2000), GSM 04.18 V9.0.0 (Jun. 2000).
Digital cellular telecommunications system (Phase 2+); Mobile-services Switching Centre—Base Station System (MSC—BSS) interface; Layer 3 specification (GSM 08.08 version 5.12.0 Release 1996), GSM 08.08 (Jun. 2000).
Digital cellular telecommunications system (Phase 2+); Mobile-services Switching Centre—Base Station System (MSC—BSS) interface; Layer 3 specification (GSM 08.08 version 6.5.0 Release 1997), ETSI TS 100 590 V6.5.0 (Jun. 2000).
Digital cellular telecommunications system (Phase 2+); Mobile-services Switching Centre—Base Station Sysiem (MSC—BSS) interface; Layer 3 specification (GSM 08.08 version 9.0.0 Release 2000), GSM 08.08 V9.00 (Jul. 2000).
Digital cellular telecommunications system (Phase 2+); Universal Mobile Telecommunications System (UMTS); Mobile radio interface Layer 3 specification; Core network protocols; Stage 3 (3GPP TS 24.008 version 6.9.0 Release 6) ETSI TS 124 008 V6.9.0 (Jun. 2005).
Digital cellular telecommunications system (Phase 2+); Universal Mobile Telecommunications System (UMTS); IP Multimedia Subsystem (IMS); Stage 2 (3GPP TS 23.228 version 7.3.0 Release 7) ETSI TS 123 228 V7.3.0 (Mar. 2006).
Digital cellular telecommunications system (Phase 2+); Universal Mobile Telecommunications System (UMTS); Mobile radio interface Layer 3 specification; Core network protocols; Stage 3 (3GPP TS 24.008 version 6.13.0 Release 6) (Jun. 2006).
Digital cellular telecommunications system (Phase 2+); Universal Mobile Telecommunications System (UNITS); IP Multimedia Subsystem (IMS); Stage 2 (3GPP TS 23.228 version 6.14.0 Release 6) (Jun. 2006).

(56) References Cited

OTHER PUBLICATIONS

Digital cellular telecommunications system (Phase 2+); Universal Mobile Telecommunications System (UMTS); IP Multimedia Subsystem (IMS); Stage 2 (3GPP TS 23.228 version 7.4.0 Release 7) (Jun. 2006).
European digital cellular telecommunication system (phase 1); BSS-MSC Layer 3 Specification; GSM 08.08 version 3.10.1 (Jan. 1995).
Gratschew et al., "A Multimedia Messaging Platform for Content Delivering," 10$^{th}$ International Conference on Telecommunications, vol. 1, pp. 431-435 (Feb. 23-Mar. 1, 2003).
Griffin et al., "Integrating SIP, Presence and FTP to provide Wireless Multimedia Messaging," IEEE Wireless Communications and Networking Conference, vol. 4 (Mar. 21, 2004).
Haartsen, "Bluetooth—The Universal Radio Interface for AD HOC, Wireless Connectivity," Ericsson Review, Ericsson, Stockholm, SE, No. 3, pp. 110-117, (1998).
Information Technology—Telecommunications and Information Exchange Between Systems—Local and Metropolitan Area Networks—Specific Requirements—Part 11: Wireless LAN Medium Access Control (MAC) and Physical Layer (PHY) Specifications, ANSI/IEEE Std 802.11, 1999 Edition (R2003).
Interdigital Communication, "Correcting status of Annex D from Informative back to Normative," 3GPP TSG-SAZ Meeting #39, 82-041339, Shenzhen, China (April 19-23, 2004).
Peersman et al., "The Global System for Mobile Communications Short Message Service" IEEE Personal Communications Society, vol. 7, No. 3, pp. 15-23 (Jun. 2000).
Rosenberg et al., "Indicating User Agent Capabilities in the Session Initiation Protocol (SIP)," Network Working Group, Request for Comments RFC3840 (Aug. 2004).
SA2, "Combined CR to 23.234 Annex D (SMS over IP)," 3GPP TSG-SA2 Meeting #40, S2-042230, Sophia Antipolis, France (May 17-21, 2004).
Salkintzis et al., "WLAN-GPRS Integration for Next-Generation Mobile Data Networks," IEEE Wireless Communications, vol. 9, No. 5, pp. 112-123 (Oct. 2002).
Siemens, "Translating an Emergency SIP URI into a routable E.164 Number," 3GPP TSG SA WG2 #36, S2-034308, New York, USA, (Nov. 24-28, 2003).
Third Generation Partnership Project, "Technical Specification Group Servies and Systems Aspects; IP Multimedia Subsystem (IMS); Stage 2 (Release 6)," 3GPP TS 23.228 V6.9.0 (Mar. 2003).
Third Generation Partnership Project, "Technical Specification Group Servies and Systems Aspects; IP Multimedia Subsystem (IMS); Stage 2 (Release 6)," 3GPP TS 23.228 V6.5.0 (Mar. 2004).
Third Generation Partnership Project, "Technical Specification Group Servies and Systems Aspects; IP Multimedia Subsystem (IMS); Stage 2 (Release 5)," 3GPP TS 23.228 V5.12.0 (Mar. 2004).
Third Generation Partnership Project, "Technical Specification Group Servies and Systems Aspects; IP Multimedia Subsystem (IMS); Stage 2 (Release 5)," 3GPP TS 23.228 V5.13.0 (Dec. 2004).
Third Generation Partnership Project, "Technical Specification Group Terminals; Technical realization of the Short Message Service (SMS) (Release 4)," 3GPP TS 23.040 v4.9.0 (Sep. 2004).
Third Generation Partnership Project, "Technical Specification Group Terminals; Technical realization of the Short Message Service (SMS) (Release 4)," 3GPP TS 23.040 V4.8.0 (Jun. 2003).
Third Generation Partnership Project, "Technical Specification Group Terminals; Technical realization of the Short Message Service (SMS) (Release 5)," 3GPP TS 23.040 V5.7.1 (Apr. 2004).
Third Generation Partnership Project, "Technical Specification Group Terminals; Technical realization of the Short Message Service (SMS) (Release 5)," 3GPP TS 23.040 V5.8.1 (Oct. 2004).
Third Generation Partnership Project, "Technical Specification Group Terminals; Technical realization of the Short Message Service (SMS) (Release 6)," 3GPP TS 23.040 V6.3.0 (Mar. 2004).
Third Generation Partnership Project, "Technical Specification Group Terminals; Technical realization of the Short Message Service (SMS) (Release 6)," 3GPP TS 23.040 V6.50 (Sep. 2004).
Third Generation Partnership Project, "Technical Specification Group GSM/EDGE Radio Access Network; Mobile radio interface layer 3 specification; Radio Resource Control Protocol (Release 1999)," 3GPP TS 04.18 V8.26.0 (Apr. 2005).
Third Generation Partnership Project, "Technical Specification Group GSM/EDGE Radio Access Network; Mobile radio interface layer 3 specification; Radio Resource Control Protocol (Release 1999)," 3GPP TS 04.18 V8.21.0 (Feb. 2004).
Third Generation Partnership Project, "Technical Specification Group Core Network; Mobile radio interface layer 3 specification (Release 1998)," 3GPP TS 04.08 V7.21.0 (Dec. 2003).
Third Generation Partnership Project, "Technical Specification Group GSM/EDGE Radio Access Network; Mobile Switching Centre—Base Station System MSC—BSS) interface; Layer 3 specification (Release 1999)," 3GPP TS 08.08 V8.15.0 (Sep. 2003).
Third Generation Partnership Project, "Technical Specification Group Core Network; Point-to-Point (PP) Short Message Service (SMS) support on mobile radio interface (Release 6)," 3GPP TS 24.011 V6.0.0 (Sep. 2003).
Third Generation Partnership Project, "Technical Specification Group Core Network; Mobile Application Part (MAP) specification; (Release 6)," 3GPP TS 29.002 V6.90 (Mar. 2005).
Third Generation Partnership Project, "Technical Specification Group Radio Access Network; Radio Resource Control (RRC); Protocol Specification (Release 6)," 3GPP TS 25.331 V6.1.0 (Mar. 2004).
Third Generation Partnership Project, "Technical Specification Group Core Network; Mobile Application Part (MAP) specification; (Release 6)," 3GPP TS 29.002 V6.5.0 (Mar. 2004).
Third Generation Partnership Project, "Technical Specification Group Radio Access Network; Radio Resource Control (RRC); Protocol Specification (Release 6)," 3GPP TS 25.331 V6.5.0 (Mar. 2005).
Third Generation Partnership Project, "Technical Specification Group Core Network; IP Multimedia Call Control Protocol based on Session Initiation Protocol (SIP) and Session Description Protocol (SDP); Stage 3 (Release 5)," 3GPP TS 24.229 V5.8.0 (Mar. 2004).
Third Generation Partnership Project, "Technical Specification Group Core Network; IP Multimedia Call Control Protocol based on Session Initiation Protocol (SIP) and Session Description Protocol (SDP); Stage 3 (Release 5)," 3GPP TS 24.229 V5.12.0 (Mar. 2005).
Third Generation Partnership Project, "Technical Specification Group Core Network; IP Multimedia Call Control Protocol based on Session Initiation Protocol (SIP) and Session Description Protocol (SDP); Stage 3 (Release 6)," 3GPP TS 24.229 V6.2.0 (Mar. 2004).
Third Generation Partnership Project, "Technical Specification Group Core Network; IP Multimedia Call Control Protocol based on Session Initiation Protocol (SIP) and Session Description Protocol (SDP); Stage 3 (Release 6)," 3GPP TS 24.229 V6.6.0 (Mar. 2005).
Third Generation Partnership Project; Technical Specification Group Services and System Aspects; 3GPP system to Wireless Local Area Network (WLAN) interworking; System description (Release 6). 3GPP TS 23.234 V6.0.0 (Mar. 2004).
Third Generation Partnership Project; Technical Specification Group Services and System Aspects; 3GPP system to Wireless Local Area Network (WLAN) interworking; System description (Release 6). 3GPP TS 23.234 V6.4.0 (Mar. 2005).
Third Generation Partnership Project; Technical Specification Group Services and System Aspects; Support of SMS and MMS Over Generic 3GPP IP Access (Release 7), 3GPP TR 23.804 V1.1.0, Apr. 2005.
Third Generation Partnership Project; Technical Specification Group Core Network and Terminals; Support of SMS and MMS Over IP Networks; Stage 3 (Release 7) 3GPP TS 24.341 V. 0.0.3, May 2006.
Tsao et al., "VSGN: A Gateway Approach to Interconnect UMTS/WLAN Networks," Personal, Indoor and Mobile Radio Communications, vol. 1, pp. 275-279, (Sep. 2002).
Vanwasi, "Messaging on the Move." Network Magazine India., http://www.networkmagazineindia.com/200109/wireless1.htm Accessed Feb. 8, 2016.

\* cited by examiner

REPORTING TERMINAL CAPABILITIES FOR SUPPORTING SHORT MESSAGE SERVICE

CROSS REFERENCE TO RELATED APPLICATIONS

This application is a continuation of U.S. patent application Ser. No. 15/270,760 filed on Sep. 20, 2016, which is a continuation of U.S. patent application Ser. No. 14/015,552, filed on Aug. 30, 2013, which issued as U.S. Pat. No. 9,578,475 on Feb. 21, 2017 which is a continuation of U.S. patent application Ser. No. 13/463,293, filed on May 3, 2012, which issued as U.S. Pat. No. 8,526,981 on Sep. 3, 2013, which is a continuation of U.S. patent application Ser. No. 12/973,570, filed on Dec. 20, 2010, which issued as U.S. Pat. No. 8,175,626 on May 8, 2012, which is a continuation of U.S. patent application Ser. No. 12/777,927, filed on May 11, 2010, which issued as U.S. Pat. No. 7,899,477 on Mar. 1, 2011, which is a continuation of U.S. patent application Ser. No. 11/112,503, filed on Apr. 22, 2005, which issued as U.S. Pat. No. 7,715,856 on May 11, 2010, which claims the benefit of U.S. Provisional Application No. 60/576,700, filed on Jun. 2, 2004, the contents of which are all hereby incorporated by reference.

FIELD OF INVENTION

The present invention generally relates to wireless local area networks (WLANs), and more particularly, to a method and apparatus for reporting terminal capabilities to support short message service (SMS) over a WLAN.

BACKGROUND

The current architecture for supporting SMS over Internet Protocol (IP) on a WLAN uses a SMS proxy on behalf of the user equipment (UE) at the IP gateway. The SMS proxy acts as a terminal front end to the Signaling System No. 7 (SS7) mobile application part (MAP) (i.e., the existing SMS for global system for mobile communication (GSM)/general packet radio service (GPRS)). The control signaling associated with SMS is not currently covered by the proxy function.

SUMMARY

The present invention extracts the SMS data message from the SS7/MAP format and sends the message to an interworking WLAN (I-WLAN) UE using an IP-based protocol. In the present invention, the SMS proxy function in the SMS IP gateway performs all of the functions performed by the SMS client in a GSM/GPRS UE.

A method for delivering a short message service (SMS) message to an interworking wireless local area network user equipment (UE) begins by registering the UE with an Internet Protocol short message gateway (IP-SM-GW). A capability report is sent from the UE to the IP-SM-GW, the capability report including the capabilities of the UE. A SMS message is transmitted from a short message service center (SMSC) to the IP-SM-GW. The capabilities of the UE are evaluated at the IP-SM-GW to determine whether the UE can receive the SMS message, and the SMS message is delivered to the UE via the IP-SM-GW if the UE has the capabilities to receive the SMS message.

A method for sending a SMS message from an interworking wireless local area network user equipment (UE) begins by registering the UE with an IP-SM-GW. A capability report, including the capabilities of the UE, is sent from the UE to the IP-SM-GW, whereby the IP-SM-GW acts as a proxy for the UE. A SMS message is transmitted from the UE to the IP-SM-GW. The SMS message is sent to a SMSC via the IP-SM-GW.

A system for delivering a SMS message to an interworking wireless local area network user equipment (UE) includes a SMSC, an IP-SM-GW, and a capability report. The SMSC transmits a SMS message for delivery to the UE. The UE registers with the IP-SM-GW, the IP-SM-GW receiving the SMS message transmitted by the SMSC. The capability report, including the capabilities of the UE, is sent from the UE to the IP-SM-GW. The IP-SM-GW evaluates the capability report and delivers the SMS message to the UE if the UE has the capabilities to receive the SMS message.

A system for sending a SMS message from an interworking wireless local area network user equipment (UE) includes an IP-SM-GW, a capability report, and a SMSC. The UE registers with the IP-SM-GW and sends the capability report, including the capabilities of the UE, to the IP-SM-GW. The IP-SM-GW acts as a proxy for the UE, and receives a SMS message sent by the UE. The IP-SM-GW sends the SMS message to the SMSC.

A method and apparatus for receiving an IP-based message, by a first UE over a WLAN, is provided. The method may comprise transmitting at least one IP-based registration message and transmitting capability information including at least a terminal type of the first UE. The first UE may receive from a second UE, the IP-based message formatted according to the capability information. The first UE may be addressed using a first MSISDN. In one embodiment, the capability information indicates a memory size of the first UE. In one embodiment, the capability information indicates support for the first UE to receive an animation.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Hereafter, a user equipment (UE) includes, but is not limited to, a wireless transmit/receive unit (WTRU), a mobile station, a fixed or mobile subscriber unit, a pager, or any other type of device capable of operating in a wireless environment. When referred to hereafter, a base station includes, but is not limited to, a Node B, a site controller, an access point, or any other type of interfacing device in a wireless environment. Although the following embodiments are described in conjunction with a UE, the embodiments also apply to a WTRU.

Figure 1:
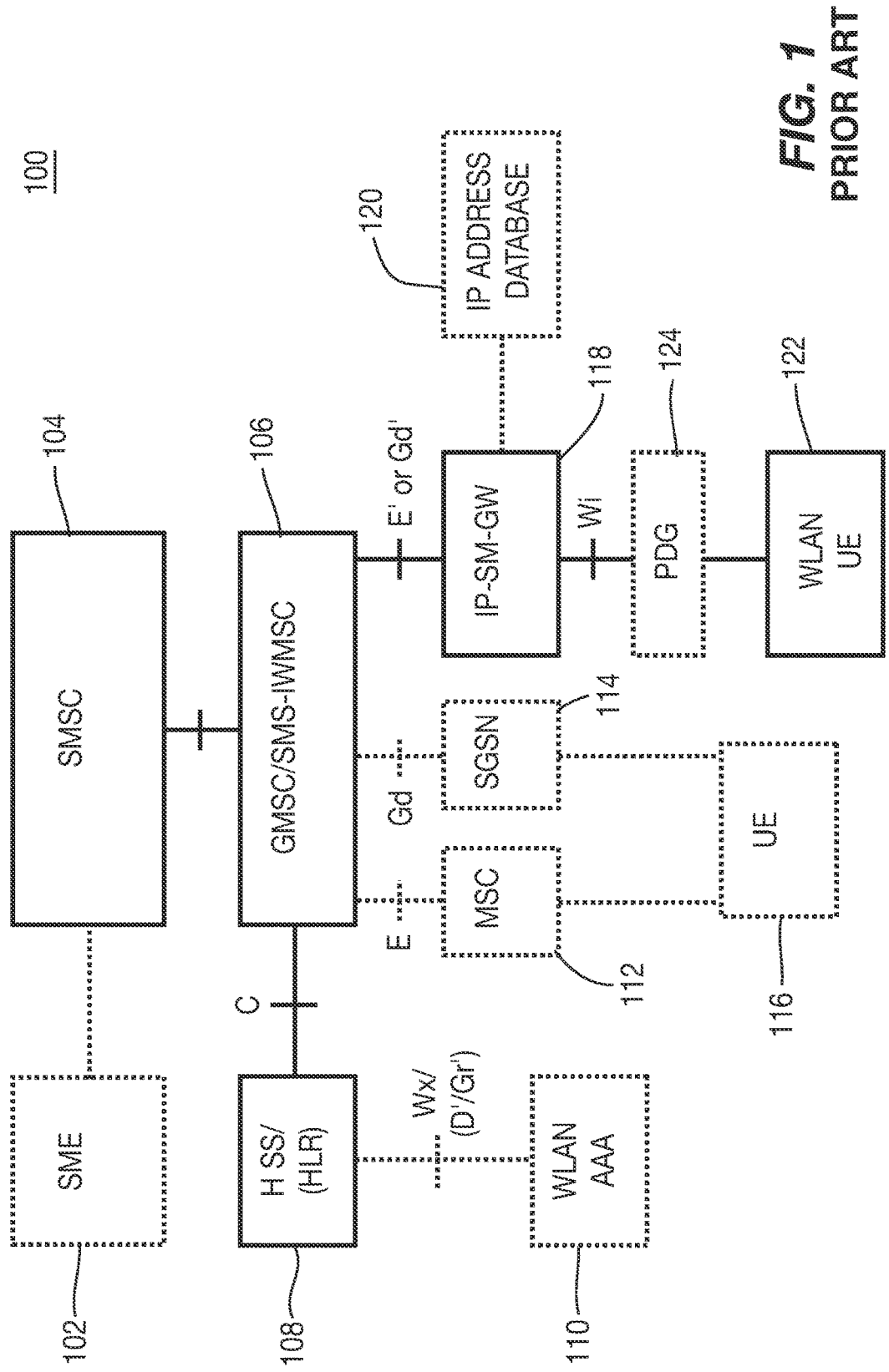
FIG. 1 is a block diagram of a SMS system.

FIG. 1 is a diagram of a SMS system 100. The system 100 includes a short message entity (SME) 102 which can send or receive short messages. The SME 102 communicates with a short message service center (SMSC) 104 that is responsible for the relaying and the store-and-forwarding of a short message between the SME 102 and a UE.

A gateway mobile switching center (GMSC)/SMS interworking MSC (SMS-IWMSC) 106 has two functions: a GMSC function and a SMS-IWMSC function. The GMSC function receives a short message from the SMSC 104, interrogates a home subscriber server (HSS)/home location register (HLR) 108 for routing information, and delivers the short message to the visited MSC or the serving GPRS support node (SGSN) of the recipient UE. The SMS-IWMSC function receives a short message from a UE and submits it to the appropriate SMSC. While shown as separate entities, the SMSC 104 and the GMSC/SMS-IWMSC 106 can be integrated into a single entity.

The HSS/HLR 108 communicates with an authentication, authorization, and accounting (AAA) server 110 for the WLAN. The AAA server 110 contains information relating to which UEs can access the WLAN, what services the UEs are permitted to use, and accounting records for each UE.

In a non-IP based setting, the GMSC/SMS-IWMSC 106 communicates with a MSC 112 and a SGSN 114. The MSC 112 and the SGSN 114 both communicate with a UE 116. The MSC 112 provides functions such as switching, signaling, paging, and inter-MSC handover. The SGSN 114 performs functions such as routing and mobility management.

When routing a SMS message, the GMSC/SMS-IWMSC 106 performs a MAP request to the HSS/HLR 108 to determine the address of the MSC 112 or the SGSN 114 where the SMS message is to be routed for delivery to the UE 116.

In an IP based setting, an IP short message gateway (IP-SM-GW) 118 provides protocol interworking between the IP client and the network for delivering a short message. The IP-SM-GW 118 communicates with the GMSC/SMS-IWMSC 106 using established MAP protocols over SS7, appearing to the GMSC/SMS-IWMSC 106 as a MSC or a SGSN. The IP-SM-GW 118 accesses an IP address database 120 to associate a mobile station integrated service digital network (ISDN) number (MSISDN) with the IP address of a WLAN UE 122. Although the IP database 120 is shown as a separate entity, it may be located in the HSS/HLR 108, in the AAA server 110, in the IP-SM-GW 118, or any other suitable location.

The IP-SM-GW 118 uses a packet data gateway (PDG) 124 to communicate with the WLAN UE 122. The IP-SM-GW 118 supports registration and authentication of the WLAN UE 122 for SMS services, and supports security associations with the WLAN UE 122. The IP-SM-GW 118 communicates with the WLAN UE 122 using IP based protocols, maintaining the format and functionality of the SMS message.

When routing a SMS message, the GMSC/SMS-IWMSC 106 performs a MAP request to the HSS/HLR 108 to determine the address of the IP-SM-GW 118. In addition, the HSS/HLR 108 provides an indication that the WLAN UE 122 is IP based (e.g., communicates with a IP-SM-GW 118 instead of a MSC 112 or a SGSN 114), provides the SS7 MAP address of the IP-SM-GW 118, and contains the necessary logic to determine that the WLAN UE 122 is connected via IP and return the address of the IP-SM-GW 118 instead of an address for a MSC or a SGSN. The AAA server 110 maintains the attach status of the WLAN UE 122, as to whether the WLAN UE 122 is IP attached.

Delivering Short Messages to a WLAN UE

Figure 2:
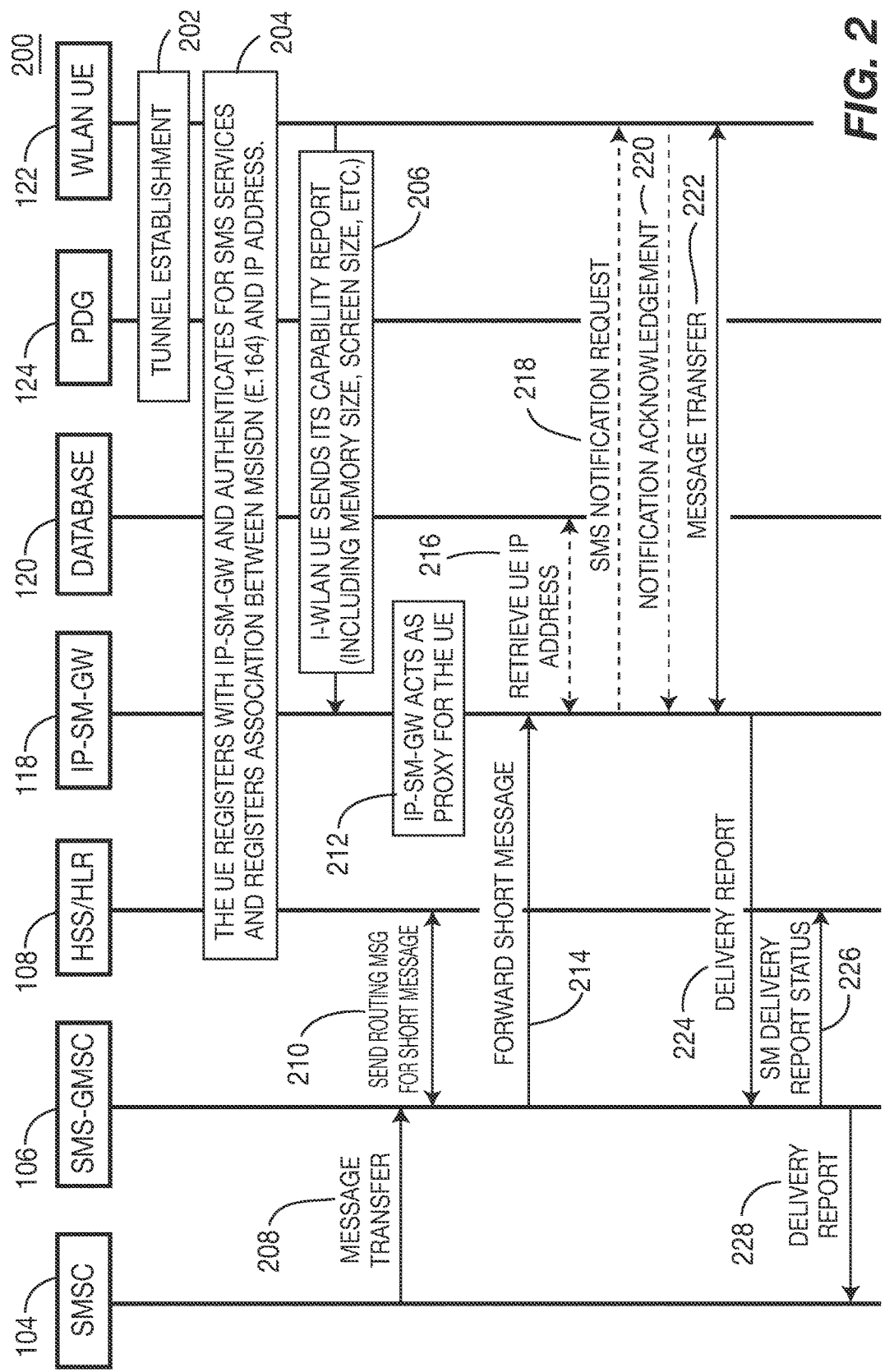
FIG. 2 is a flow diagram of a method for delivering a short message to a WLAN UE.

A method 200 for delivering short messages to a WLAN UE is shown in FIG. 2. A tunnel between the WLAN UE 122 and the home PDG 124 is established (step 202). Following establishment of the tunnel, the UE 122 registers with the IP-SM-GW 118, establishing any necessary security association, authenticates for support of SMS services, and registers the association between the UE's MSISDN (E.164) and its IP address (step 204).

The UE 122 sends its capabilities (as a capability report) to the IP-SM-GW 118 (step 206). The UE capabilities include, for example, memory size, terminal type, screen size, and whether the UE supports session initiation protocol (SIP). The IP-SM-GW 118 uses the UE's capabilities to determine whether to reject delivery of a SMS message and to ensure that only SMS data and notifications are transmitted over IP to the UE 122.

The SMSC 104 forwards a SMS message to the SMS-GMSC 106 (step 208). The SMS-GMSC 106 interrogates the HSS/HLR 108 to retrieve routing information for the UE 122 (step 210). When a user is registered on a WLAN for delivery of SMS messages, the HSS/HLR 108 returns the address of the IP-SM-GW 118 (rather than the address of the appropriate MSC or SGSN), whereby the IP-SM-GW 118 acts as a proxy for the UE 122 (step 212). The SMS proxy (i.e., the IP-SM-GW 118) is able to reject the delivery of SMS messages based on the capabilities of the UE 122 (e.g., memory size, screen size, or terminal type) and the nature of the SMS data (text, animation, etc.).

The SMS-GMSC 106 delivers the SMS message to the IP-SM-GW 118 using protocols as if it was a SMS message delivered to a MSC or SGSN (step 214). Optionally, the IP-SM-GW 118 interrogates the database 120 to identify the IP address and relevant security parameters associated with the UE 122 (step 216).

SMS messages can be delivered by two methods: notification and direct delivery. When the notification delivery method is used, the IP-SM-GW 118 sends a SMS notification request to the UE 122 to inform it that a SMS message is available for delivery (step 218). On receipt of the SMS notification message, the UE 122 responds to the IP-SM-GW 118 with a notification acknowledgement indicating whether it wishes to receive the SMS message (step 220).

If the direct delivery method is used (steps 218 and 220 are skipped), or if a positive acknowledgement is received from the UE 122 in response to the SMS notification request, the IP-SM-GW 118 delivers the SMS message to the UE 122 using one of several possible protocols, e.g., wireless application protocol (WAP), short message peer to peer protocol (SMPP), mobile message access protocol (MMAP), extensible markup language (XML), or SIP (e.g., an IP multimedia subsystem (IMS) client) (step 222). If the IP-SM-GW 118 rejects delivery of the SMS message, then steps 216-222 are skipped, and the method 200 continues with step 224.

The IP-SM-GW 118 sends a delivery report back to the SMS-GMSC 106 (step 224). The delivery report either confirms that the SMS message was delivered to the UE 122 or informs the SMS-GMSC 106 that the SMS message could not be delivered and a reason for the failure. The SMS-GMSC 106 sends a SM delivery report status to the HSS/HLR 108 (step 226). The SMS-GMSC 106 sends the SM delivery report to the SMSC 104 (step 228). Error handling is preferably performed using the mechanisms defined in 3GPP Technical Specification (TS) 23.040 v6.3.0 (2004 March), with the IP-SM-GW 118 acting as a front end for the UE 122, although other error handling techniques may be used.

Figure 3:
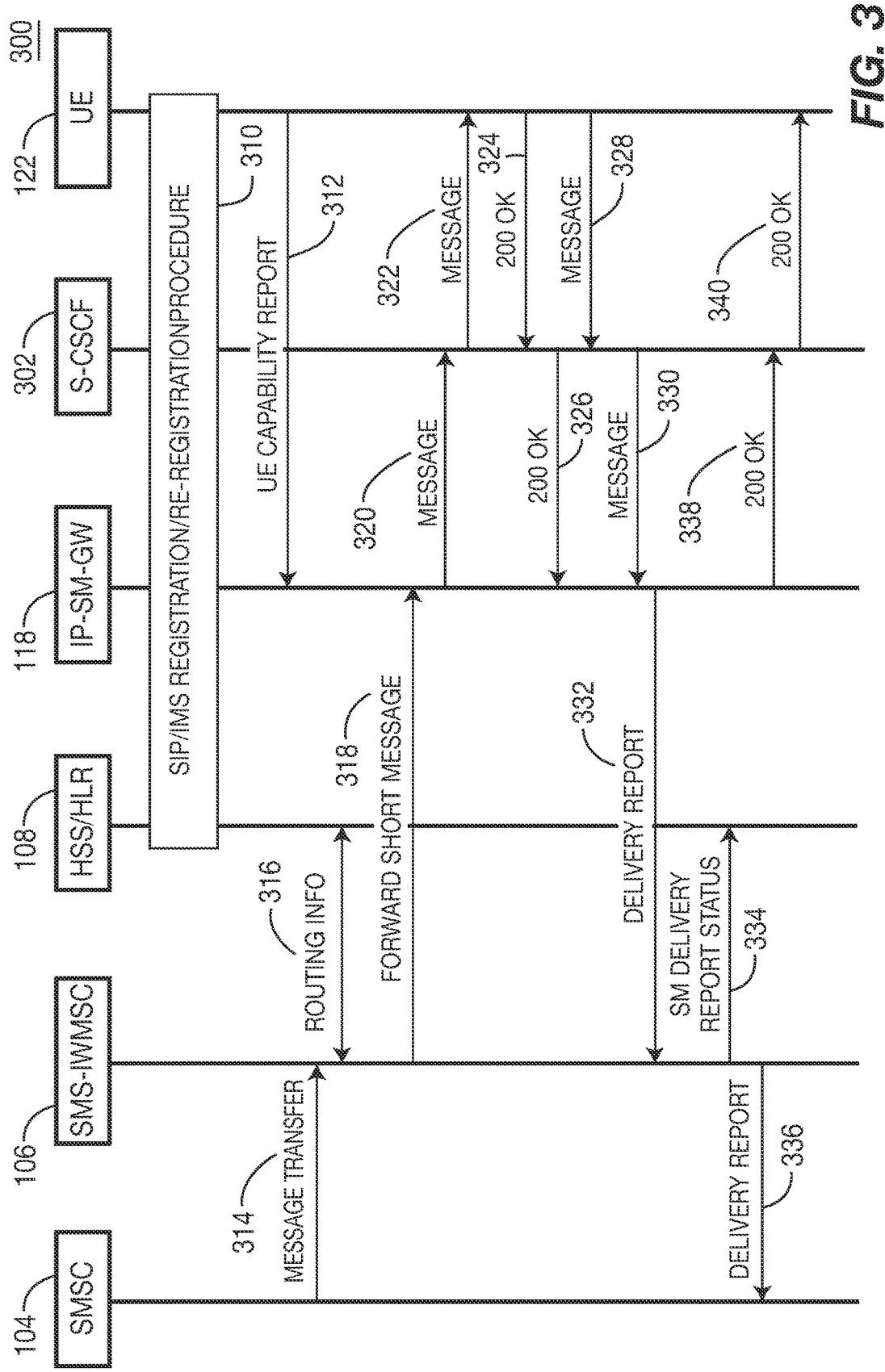
FIG. 3 is a flow diagram of a method for delivering a short message to a WLAN UE using SIP/IMS.

FIG. 3 is a flow diagram of a method 300 for delivering a short message to a WLAN UE 122 using SIP/IMS. The UE 122 registers with a serving call session control function (S-CSCF) 302 according to the IMS registration procedure (step 310). The registration information is also stored in the HSS/HLR 108. The UE 122 sends a capability report to the IP-SM-GW 118 (step 312). The UE capabilities include, for example, memory size, terminal type, screen size, and whether the UE supports session initiation protocol (SIP). The IP-SM-GW 118 uses the UE's capabilities to determine whether to reject delivery of a SMS message, by acting as a proxy for the UE 122.

The SMSC 104 forwards a SMS message to the SMS-GMSC 106 (step 314). The SMS-GMSC 106 interrogates the HSS/HLR 108 to retrieve routing information (step 316). When a user is IMS registered, the HSS/HLR 108 returns the address of the IP-SM-GW 118 along with the address of the MSC.

The SMS-GMSC 106 delivers the SMS message to the IP-SM-GW 118, in the same manner that it delivers a SMS message to an MSC or a SGSN, carrying the MSISDN of the target UE 122 (step 318). The IP-SM-GW 118 uses the TEL-URL of the target UE 122 to populate a SIP Request URI, and then sends the SMS message to the S-CSCF 302 using the SIP MESSAGE method (step 320). The S-CSCF 302 then forwards the SIP MESSAGE (SMS message) to the UE 122 (step 322).

Upon receipt of the SIP MESSAGE (SMS message), the UE 122 responds by sending a 200 OK message to the S-CSCF 302 (step 324). It is noted that the 200 OK message is not a delivery report, as a 200 OK message cannot carry the information contained in a delivery report. The S-CSCF 302 sends a 200 OK message to the IP-SM-GW (step 326).

The UE 122 then sends a delivery report to the S-CSCF 302 using the SIP MESSAGE method (step 328). Based on filter information, the S-CSCF 302 forwards the SIP MESSAGE (delivery report) to the IP-SM-GW 118 (step 330), which extracts the delivery report from the SIP MESSAGE format and sends the delivery report to the SMS-GMSC 106 (step 332).

The SMS-GMSC 106 sends a SM delivery report status message to the HSS/HLR 108 (step 334). The SMS-GMSC 106 forwards the delivery report to the SMSC 104 (step 336). The IP-SM-GW 118 acknowledges that the delivery report was sent to the SMSC 104 by sending a 200 OK message to the S-CSCF 302 (step 338). The S-CSCF acknowledges the delivery report to the UE 122 by sending a 200 OK message to the UE (step 340).

Sending Short Messages from a WLAN UE

Figure 4:
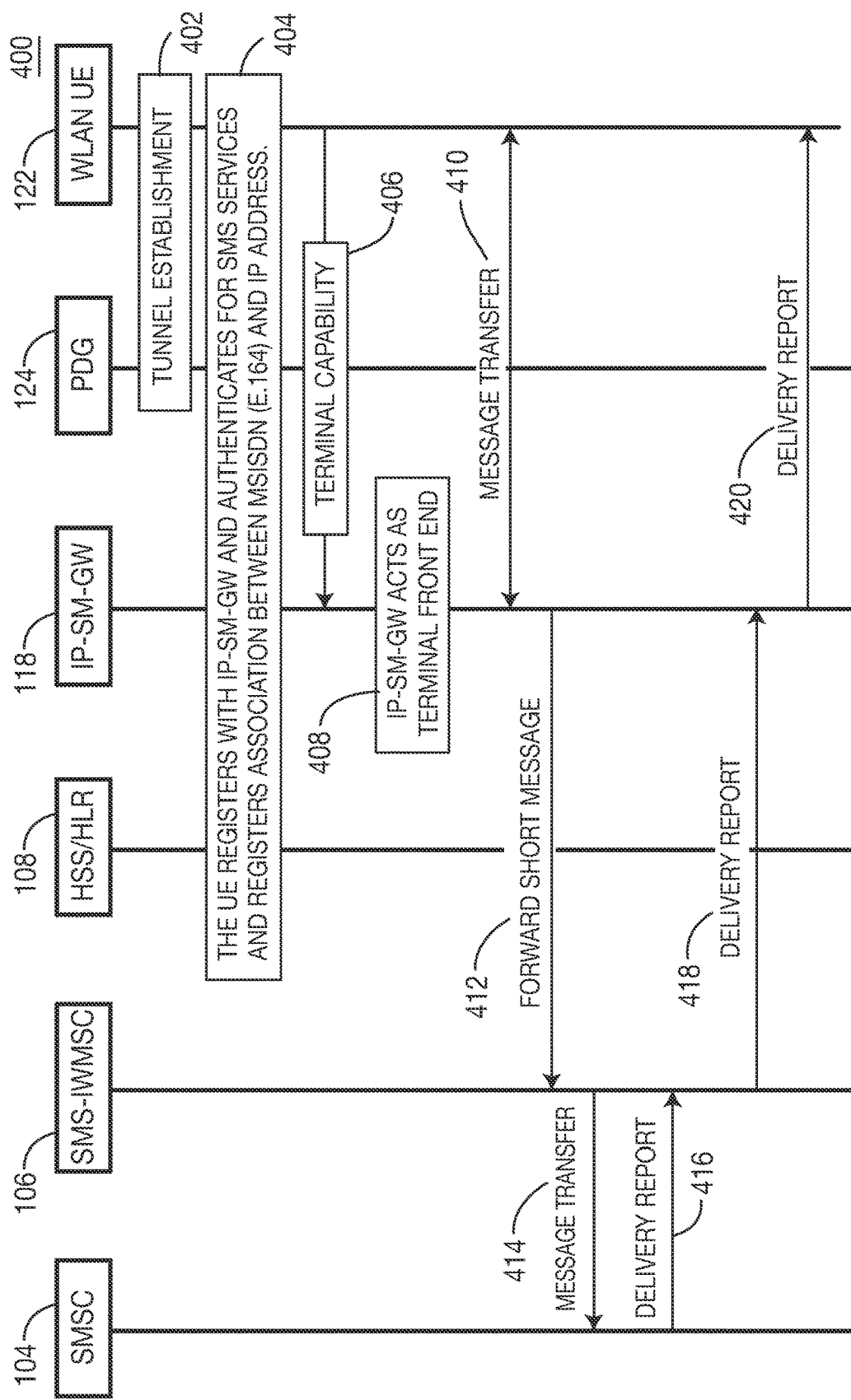
FIG. 4 is a flow diagram of a method for sending a short message from a WLAN UE.

FIG. 4 is a diagram of a method 400 for sending a short message from the WLAN UE 122. A tunnel between the UE 122 and the home PDG 124 is established (step 402). Following establishment of the tunnel, the UE 122 registers with the IP-SM-GW 118 establishing any necessary security association, authenticates for support of SMS services, and registers the association between the UE's MSISDN (E.164) and its IP address (step 404). The association information for the UE 122 is also recorded in the HSS/HLR 108. The UE 122 sends its capability information to the IP-SM-GW 118 to enable the SMS terminal proxy operation (step 406). After sending the capability information, the IP-SM-GW 118 handles all SMS control messages for the UE 122 (step 408).

The UE 122 delivers a SMS message to the IP-SM-GW 118, using e.g., WAP, SMPP, MMPP, or XML (step 410). The IP-SM-GW 118 extracts the SMS message and forwards it to the SMS-IWMSC 108 using the standard MAP, as if the IP-SM-GW 118 was a MSC or a SGSN (step 412).

The SMS-IWMSC 106 forwards the SMS message to the SMSC 104 (step 414). Upon receipt of the SMS message, the SMSC 104 sends a delivery report to the SMS-IWMSC 106 (step 416). The SMS-IWMSC 106 sends the delivery report to the IP-SM-GW 118 (step 418). The delivery report is sent with an indication of whether the delivery was a success or a failure. If there was a delivery failure, the SMSC 104 reports back to the SMS-IWMSC 106 and the SMS-IWMSC 106 will attempt to retransmit the SMS message. If the number of retries exceeds a threshold, then a delivery failure report will be sent to the UE 122.

The IP-SM-GW 118 sends the delivery report to the UE 122 using a proprietary mechanism and/or protocols (step 420). In a preferred embodiment, the delivery report is sent via an IP-based transfer, such as SMPP. The delivery report either confirms that the SMS message was delivered to the SMSC 104 or informs the UE 122 that the SMS message could not be delivered and a reason for the failure.

As with message receipt, the error handling for message sending is preferably performed using the mechanisms defined in TS 23.040 v6.3.0 (2004 March), with the IP-SM-GW 118 acting as a front end for the UE 122, although other error handling techniques may be used.

The implementation of new procedures in the I-WLAN UE side is reduced, where only simple operations are performed to confirm reception of the SMS data or to report a corrupt message for retransmission purposes.

Figure 5:
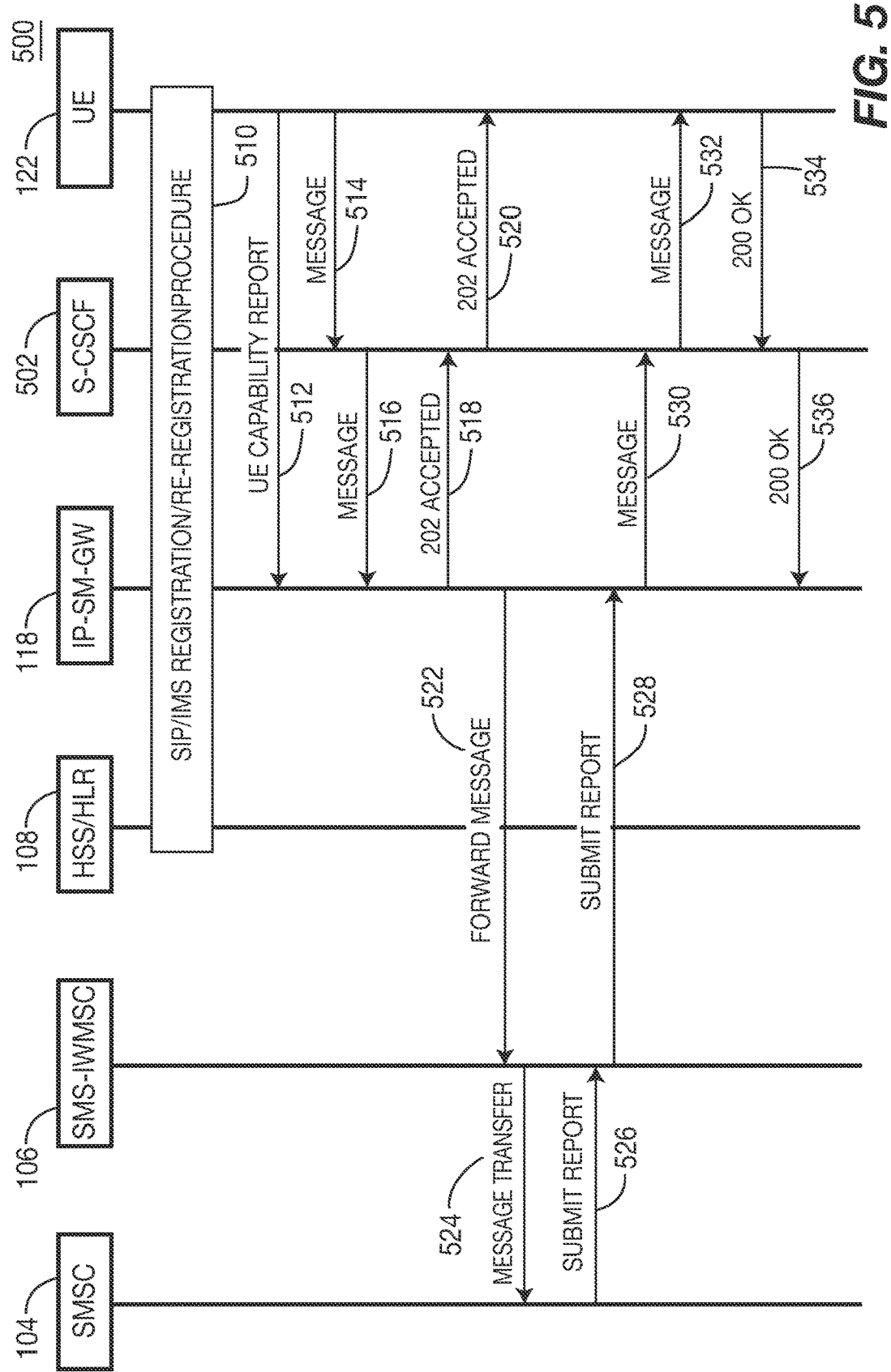
FIG. 5 is a flow diagram of a method for sending a short message from a WLAN UE using SIP/IMS.

FIG. 5 is a flow diagram of a method 500 for sending a short message from a WLAN UE 122 using SIP/IMS. The UE 122 registers with a S-CSCF 502 according to the IMS registration procedure (step 510). The registration information is also stored in the HSS/HLR 108. The UE 122 sends a capability report to the IP-SM-GW 118 (step 512). The UE capabilities include, for example, memory size, terminal type, screen size, and whether the UE supports session initiation protocol (SIP). The IP-SM-GW 118 uses the UE's capabilities to enable SMS terminal proxy operation, allowing the IP-SM-GW 118 to handle all SMS control messages for the UE 122.

The UE 122 submits a SMS message to the S-CSCF 502 using the SIP MESSAGE method (step 514). The S-CSCF 502 forwards the SIP MESSAGE (SMS message) to the IP-SM-GW 118 based on filter information (step 516). The IP-SM-GW 118 indicates that the SIP MESSAGE (SMS message) was received by sending a SIP 202 Accepted message to the S-CSCF 502 (step 518). The message receipt information is forwarded by the S-CSCF 502 to the UE 122 by a SIP 202 Accepted message (step 520).

The IP-SM-GW 118 extracts the SMS message from the SIP MESSAGE and forwards it to the SMS-IWMSC 106 using standard MAP signaling (step 522). The address of the SMSC 104 is extracted either from the R-URI of the SIP MESSAGE or from the SMS content. The SMS-IWMSC 106 forwards the SMS message to the SMSC 104 (step 524).

The SMSC 104 sends a submit report to the SMS-IWMSC 106 (step 526). The submit report is an acknowledgement that the SMS message was received by the SMSC 104. The SMS-IWMSC 106 sends the submit report to the IP-SM-GW 118 (step 528). The IP-SM-GW 118 sends the submit report to the S-CSCF 502 using the SIP MESSAGE method (step 530). The S-CSCF 502 forwards the SIP MESSAGE (submit report) to the UE 122 (step 532). The UE 122 acknowledges receipt of the SIP MESSAGE (submit report) by sending a 200 OK message to the S-CSCF 502 (step 534), which is then forwarded to the IP-SM-GW 118 (step 536).

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method performed by a first user equipment (UE), the method comprising:
    transmitting at least one Internet Protocol (IP)-based registration message;
    transmitting capability information including at least a terminal type of the first UE; and
    receiving, by the first UE from a second UE, an IP-based data message, wherein the IP-based data message is formatted according to the capability information;
    wherein the first UE is addressed using a first Mobile Subscriber Integrated Services Digital Network Number (MSISDN).

2. The method according to claim 1, wherein the least one IP-based registration message and the IP-based data message are transmitted over a wireless local area network (WLAN).

3. The method according to claim 1, wherein the first MSISDN is provided in the registration message.

4. The method according to claim 1, wherein the capability information indicates a memory size of the first UE.

5. The method according to claim 1, wherein the capability information indicates support for the first UE to receive an animation.

6. The method according to claim 1, wherein the IP-based data message includes the first MSISDN.

7. The method of claim 1, wherein the IP-based data message includes a second MSISDN, wherein the second MSISDN is an identifier of an originator of the IP-based message.

8. The method of claim 1, wherein the IP-based data message is a peer-to-peer protocol message.

9. A first user equipment (UE) comprising:
    a transmitter configured to transmit at least one Internet Protocol (IP)-based registration message;
    the transmitter further configured to transmit capability information including at least a terminal type of the first UE; and
    a receiver configured to receive an IP-based data message from a second UE, wherein the IP-based data message is formatted according to the capability information;
    wherein the first UE is addressed using a first Mobile Subscriber Integrated Services Digital Network Number (MSISDN).

10. The first UE according to claim 9, wherein the least one IP-based registration message and the IP-based data message are transmitted over a wireless local area network (WLAN).

11. The first UE according to claim 9, wherein the first MSISDN is provided in the registration message.

12. The first UE according to claim 9, wherein the capability information indicates a memory size of the first UE.

13. The first UE according to claim 9, wherein the capability information indicates support for the first UE to receive an animation.

14. The first UE according to claim 9, wherein the IP-based data message includes the first MSISDN.

15. The first UE of claim 9, wherein the IP-based data message includes a second MSISDN, wherein the second MSISDN is an identifier of an originator of the IP-based message.

16. The first UE of claim 9, wherein the IP-based data message is a peer-to-peer protocol message.

17. A first user equipment (UE) comprising:
    a transmitter configured to transmit at least one Internet Protocol (IP)-based registration message;
    the transmitter further configured to transmit capability information including at least a terminal type of the first UE; and
    the transmitter further configured to transmit a Short Message Peer-to-Peer (SMPP) message to a second UE, wherein the SMPP-based data message is formatted according to the capability information;
    wherein the second UE is addressed using a Mobile Subscriber Integrated Services Digital Network Number (MSISDN).

18. The first UE of claim 17, wherein the capability information is transmitted in a session initiation protocol (SIP) message.

19. The first UE of claim 18, wherein the SIP message is sent to an internet protocol multimedia subsystem (IMS).

20. The first UE of claim 17, wherein the SMPP message is sent via a wireless local area network (WLAN).

* * * * *